US008610831B2

(12) United States Patent
Williams et al.

(10) Patent No.: US 8,610,831 B2
(45) Date of Patent: Dec. 17, 2013

(54) METHOD AND APPARATUS FOR DETERMINING MOTION

(75) Inventors: Lance Williams, Toluca Lake, CA (US); Xiaohui Shen, Evanston, IL (US); Gang Hua, White Plains, NY (US)

(73) Assignee: Nokia Corporation, Espoo (FI)

( * ) Notice: Subject to any disclaimer, the term of this patent is extended or adjusted under 35 U.S.C. 154(b) by 422 days.

(21) Appl. No.: 12/902,961

(22) Filed: Oct. 12, 2010

(65) Prior Publication Data

US 2012/0086864 A1   Apr. 12, 2012

(51) Int. Cl.
*H04N 5/14* (2006.01)
(52) U.S. Cl.
USPC ......................................................... 348/699
(58) Field of Classification Search
None
See application file for complete search history.

(56) References Cited

U.S. PATENT DOCUMENTS

| | | | | |
|---|---|---|---|---|
| 5,454,043 A * | 9/1995 | Freeman | ...................... | 382/168 |
| 5,594,469 A | 1/1997 | Freeman et al. | | |
| 6,128,003 A * | 10/2000 | Smith et al. | ................... | 345/157 |
| 6,191,773 B1 * | 2/2001 | Maruno et al. | ................ | 345/158 |
| 7,058,204 B2 * | 6/2006 | Hildreth et al. | .............. | 382/103 |
| 7,061,525 B1 * | 6/2006 | Tanaka et al. | ............. | 348/211.8 |
| 7,340,077 B2 * | 3/2008 | Gokturk et al. | ............... | 382/103 |
| 7,598,942 B2 * | 10/2009 | Underkoffler et al. | ........ | 345/158 |
| 2004/0001113 A1 | 1/2004 | Zipperer et al. | | |
| 2005/0225638 A1* | 10/2005 | Tanaka et al. | ................. | 348/159 |
| 2005/0283752 A1* | 12/2005 | Fruchter et al. | .............. | 717/100 |
| 2007/0183512 A1 | 8/2007 | Li et al. | | |
| 2008/0273755 A1 | 11/2008 | Hildreth | | |
| 2010/0027845 A1 | 2/2010 | Kim et al. | | |
| 2010/0063813 A1 | 3/2010 | Richter et al. | | |
| 2010/0136957 A1 | 6/2010 | Horodezky et al. | | |

FOREIGN PATENT DOCUMENTS

| | | |
|---|---|---|
| EP | 1059608 A2 | 12/2000 |
| EP | 2079004 A1 | 7/2009 |
| WO | 2006108279 A1 | 10/2006 |
| WO | 2009026337 A1 | 2/2009 |
| WO | 2010028176 A1 | 3/2010 |

OTHER PUBLICATIONS

John Peterson, Albert technical Memo, Jun. 1990, #5 How to use Knot Vectors, pp. 1-8 From Google search and the link is : http://www.saccade.com/writing/graphics/KnotVectors.pdf.*
International Search Report and Written Opinion, received in corresponding Patent Cooperation Treaty Application No. PCT/IB2011/054518, dated Feb. 6, 2012, 11 pages.
International Search Report and Written Opinion, received in related U.S. Appl. No. 12/902,952 corresponding Patent Cooperation Treaty Application No. PCT/IB2011/054516, dated Feb. 6, 2012, 11 pages.

(Continued)

*Primary Examiner* — Joseph Ustaris
*Assistant Examiner* — Zhubing Ren
(74) *Attorney, Agent, or Firm* — McClure and Associates, PLLC

(57) ABSTRACT

An apparatus, comprising a processor and memory configured to cause the apparatus to perform at least the following: receiving a video indicating a motion, generating a set of normalized representations of movement based, at least in part, on the video, evaluating a reference set of representations with respect to the set of normalized representations of the movement, and determining that at least one predetermined motion correlates to the set of normalized representations of the movement based, at least in part, on the evaluation is disclosed.

16 Claims, 8 Drawing Sheets

(56) References Cited

OTHER PUBLICATIONS

Donoser, Michael, et al., "Real Time Appearance Based Hand Tracking", Research Paper, Institute for Computer Graphics and Vision, 2008, 4 pages.

Derpanis, Konstantinos, et la., "Hand Gesture Recognition within a Linguistics-Based Framework", Research Paper, York University, 2004, 14 pages.

Ashutosh, et al., "A Gesture Based Interactive for Remote Robot Control", TENCON '98, New Delhi, India, Dec. 17-19, 1998, pp. 158-161.

\* cited by examiner

METHOD AND APPARATUS FOR DETERMINING MOTION

RELATED APPLICATIONS

This application relates to U.S. application Ser. No. 12/902,952, titled Method and Apparatus for Determining Motion, filed Oct. 12, 2010, which is hereby incorporated by reference in its entirety.

TECHNICAL FIELD

The present application relates generally to determining motion.

BACKGROUND

Electronic devices are experiencing widespread use in today's society. Many electronic devices are capable of interpreting vast amounts of information, such as audio, video, messages, contact information, etc. Such electronic devices may be capable of interpreting one or more aspects of this information.

SUMMARY

Various aspects of examples of the invention are set out in the claims.

An apparatus, comprising a processor and memory configured to cause the apparatus to perform at least the following: receiving a video indicating a motion, generating a set of normalized representations of movement based, at least in part, on the video, evaluating a reference set of representations with respect to the set of normalized representations of the movement, and determining that at least one predetermined motion correlates to the set of normalized representations of the movement based, at least in part, on the evaluation is disclosed.

A method comprising receiving a video indicating a motion, generating a set of normalized representations of movement based, at least in part, on the video, evaluating a reference set of representations with respect to the set of normalized representations of the movement, and determining that at least one predetermined motion correlates to the set of normalized representations of the movement based, at least in part, on the evaluation is disclosed.

A computer-readable medium encoded with instructions that, when executed by a computer, perform: receiving a video indicating a motion, generating a set of normalized representations of movement based, at least in part, on the video, evaluating a reference set of representations with respect to the set of normalized representations of the movement, and determining that at least one predetermined motion correlates to the set of normalized representations of the movement based, at least in part, on the evaluation is disclosed.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

An embodiment of the invention and its potential advantages are understood by referring to FIGS. 1A through 10 of the drawings.

In an example embodiment, a user may desire to have an apparatus determine motion. For example, a user may desire for the apparatus to evaluate motion of a person, a group of people, one or more animals, an object, and/or the like. For example, a user may desire for an apparatus to determine motion of a flock of geese. In another example, a user may desire for an apparatus to determine motion of a river.

In yet another example, a user may desire to interact with an apparatus by way of motion, such as a gesture. For example, a disabled user may be able to interact with the apparatus more efficiently using motion than another form of interaction, such as typing. In another example, a user in a social environment may benefit from a possibility of interacting with the apparatus via motions that do not conflict with the social environment.

In an example embodiment, an apparatus identifies a motion and performs an action based on the identified motion. For example, the apparatus may invoke an input event, such as selecting information, moving a cursor, running a program, modifying information, adding information, deleting information, and/or the like.

In an example embodiment, an apparatus determines posture associated with a motion. For example, an apparatus may differentiate between a motion having a posture and the same motion having a different posture. A posture may relate to configuration of a performer of the motion. Such a motion performer may be a hand, an object, a group of objects, and/or the like. In an example embodiment, a gesture comprises posture information and motion information.

FIGS. 1A-1G are diagrams illustrating a posture according to at least one example embodiment. The examples of FIGS. 1A-1G are merely examples of postures, and do not limit the scope of the claims. For example, orientation may vary, finger position may vary, number of hands may vary, and/or the like. Even though the examples of FIGS. 1A-1G relate to a hand, a posture may relate to an object, a plurality of objects, a different body part, a plurality of body parts, and/or the like.

Figure 1A:
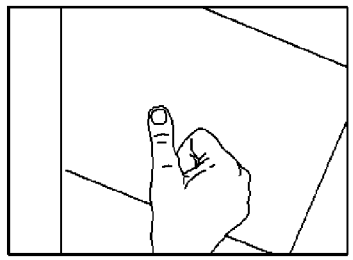
FIGS. 1A-1G are diagrams illustrating a posture according to at least one example embodiment.
Figure 1B:
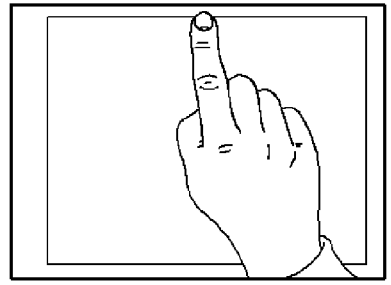
Figure 1C:
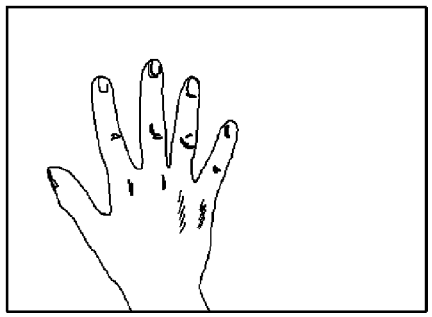
Figure 1D:
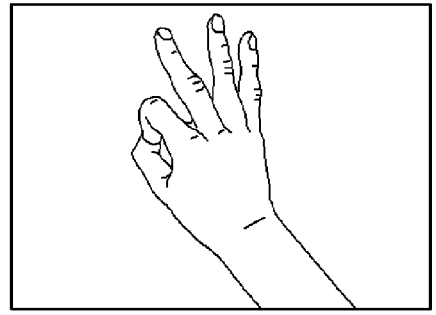
Figure 1E:
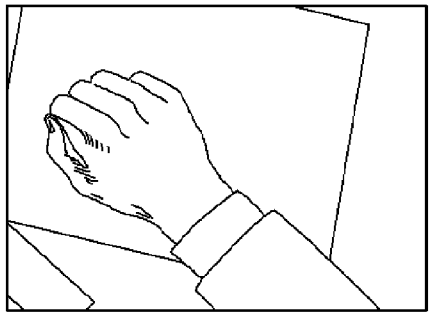
Figure 1F:
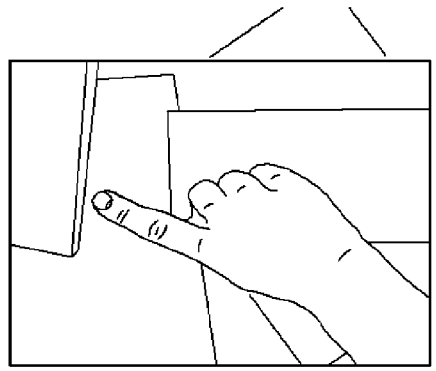
Figure 1G:
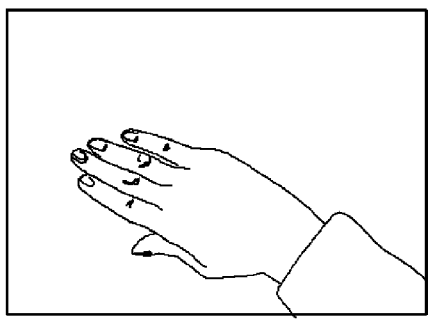

FIG. 1A illustrates an example of a posture relating to a closed hand with an extended thumb. FIG. 1B illustrates an example of a posture relating to a closed hand with an extended index finger pointing upward. FIG. 1C illustrates an example of a posture relating to an open hand with spread fingers. FIG. 1D illustrates an example of a posture relating to an open hand with spread fingers wherein the index finger and thumb are touching each other. FIG. 1E illustrates an example of a posture relating to a closed hand absent any extended fingers. FIG. 1F illustrates an example of a posture relating to a closed hand with an extended index finger pointing leftward. FIG. 1G illustrates an example of a posture relating to an open hand with extended fingers pointing leftward.

FIGS. 2A-2J are diagrams illustrating a predetermined motion according to at least one example embodiment. The examples of FIGS. 2A-2J are merely examples of predetermined motion, and do not limit the scope of the claims. For example, orientation may vary, pattern may vary, direction may vary, and/or the like. Even though the examples of FIGS. 2A-2J relate to a two-dimensional movement, a predetermined motion may relate to a three dimensional motion.

In an example embodiment, a predetermined motion is a motion that an apparatus is capable of identifying. For example, an apparatus may be capable of identifying the predetermined motions of FIGS. 2A-2J.

An apparatus may determine that a motion, such as a motion performed by a user, correlates to a predetermined motion by evaluating reference motion information. The apparatus may access reference motion information. The reference motion information comprises information for identifying that a motion correlates to a predetermined motion. The reference motion information relating to the plurality of predetermined motions may be accessed by way of a memory, such as non-volatile memory 42 of FIG. 10, by way of a separate apparatus, and/or the like. Reference motion information may comprise sets of representations that are associated with predetermined motions. The set of representations that is associated with a predetermined motion may be a set of scalar representation, a set of vector representations, a set of purely directional vector representations, and/or the like. In an example embodiment, the sets of representations associated with the predetermined motions are normalized. Normalization may comprise each set of representations having a common number of representations. The common number may be a predetermined number of representations for each set of representations. Normalization may comprise each representation of each set of representations having a normalized structure, similar as described with reference to FIGS. 4A-4D and FIGS. 5A-5B. Normalization may comprise each set of representations having a common size.

Figure 2A:
FIGS. 2A-2J are diagrams illustrating a predetermined motion according to at least one example embodiment.
Figure 2B:
Figure 2C:
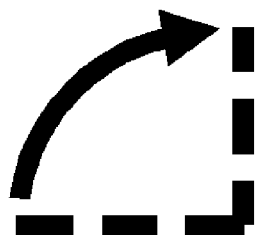
Figure 2D:
Figure 2E:
Figure 2F:
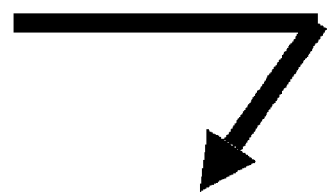
Figure 2G:
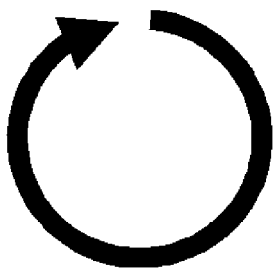
Figure 2H:
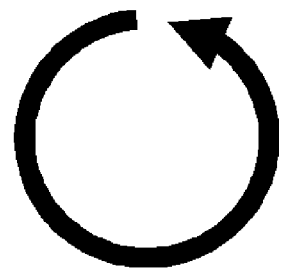
Figure 2I:
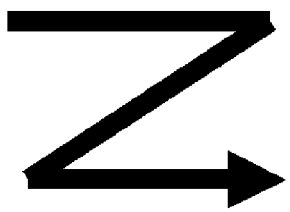
Figure 2J:

FIG. 2A illustrates an example of a predetermined motion relating to a straight rightward motion. FIG. 2B illustrates an example of a predetermined motion relating to a straight leftward motion. FIG. 2C illustrates an example of a predetermined motion relating to an upward rightward arcing motion. FIG. 2D illustrates an example of a predetermined motion relating to a downward leftward arcing motion. FIG. 2E illustrates an example of a predetermined motion relating to a downward motion followed by a rightward motion. FIG. 2F illustrates an example of a predetermined motion relating to a rightward motion followed by a downward motion. FIG. 2G illustrates an example of a predetermined motion relating to a clockwise circular motion. FIG. 2H illustrates an example of a predetermined motion relating to a counter-clockwise circular motion. FIG. 2I illustrates an example of a predetermined motion relating to a Z-shaped motion. FIG. 2J illustrates an example of a predetermined motion relating to a crossing motion.

Figure 3A:
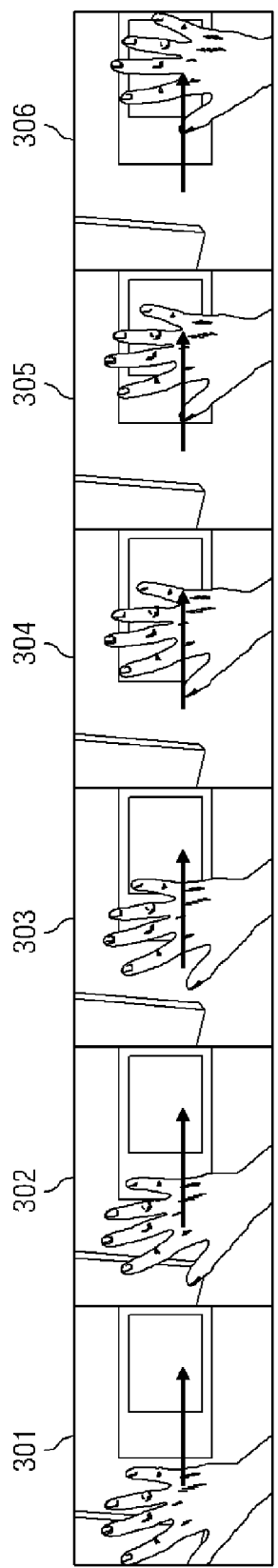
FIGS. 3A-3C are diagrams illustrating representations of part of a video according to at least one example embodiment.
Figure 3B:
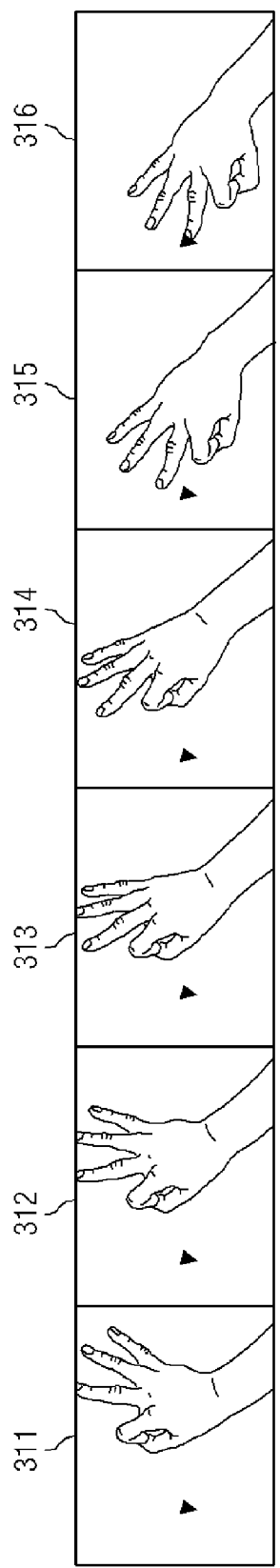
Figure 3C:
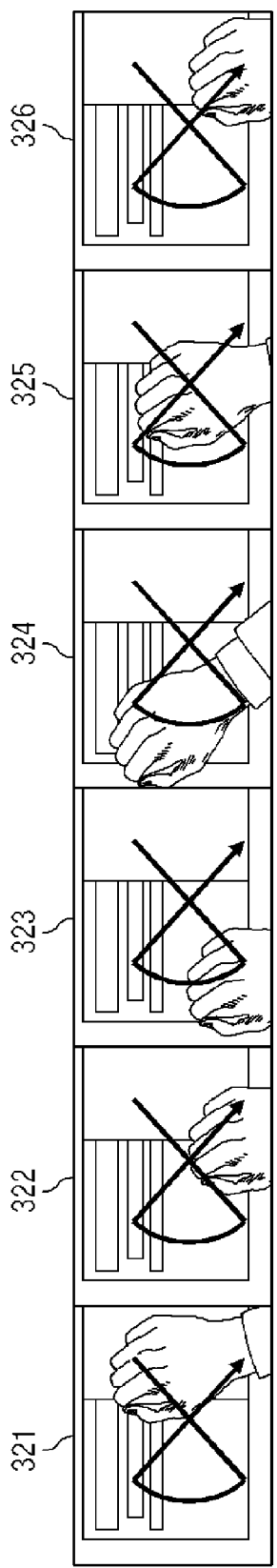

FIGS. 3A-3C are diagrams illustrating representations of part of a video according to at least one example embodiment. The examples of FIGS. 3A-3C are merely examples of parts of a video, and do not limit the scope of the claims. For example, number of parts may vary, size may vary, orientation may vary, and/or the like.

In an example embodiment, an apparatus may receive a video that indicates a motion. The apparatus may receive the video from an external apparatus, such as a video camera, from a database, from a camera module of the apparatus, such as camera module 36 of FIG. 10, from a message, and/or the like. The video may have been previously captured or may be in the process of being captured. The video may comprise a plurality of images, frames, animations, and/or the like. The indication of motion of the video may relate to a video of a user performing a gesture, a video of people performing a motion, and/or the like.

The examples of FIGS. 3A-3C represent images associated with at least part of a video. Each image may relate to a sampled image from the video, a frame from the video, and/or the like. The images may relate to a part of the video that is the entirety of the video or a part of the video that is less than the entirety of the video. Even though the examples of FIGS. 3A-3C indicate a set of 6 images, number of images may vary across embodiments, and does not limit the scope of the claims.

An apparatus may select a set of images from the video for evaluation. The apparatus may select the set of images based, at least in part, on a determined video time interval. The apparatus may determine the video time interval based, at least in part, on analysis of the motion of the video, a predetermined directive, number of representations associated with a predetermined motion, and/or the like. For example, the apparatus may determine a video time interval such that number of images in the set of images is equal to the number of representations of a reference set of representations that are associated with a predetermined motion. In such an example, the video time interval may be determined such that the video time interval substantially uniformly segments the part of the video. For example, if there are 7 representations in a reference set of representations associated with a predetermined motion, the apparatus may determine the video time interval such that the apparatus selects a set of 7 images from 7 substantially uniform time segments of the video. In such an example, the apparatus may select an image representing the start of the part of the video, and an image representing each subsequent substantially 1 second interval thereafter. The video time interval may vary insubstantially due to video encoding, timing associated with full frames, and/or the like.

The apparatus may select the set of images by selecting a set of paired frame images. The set of paired frame images may be selected such that each pair of framed images comprises two frame images of adjacent frames of the video. The apparatus may select the set of paired frame images such that each pair of frame images represents a part of the video that is substantially separated by a video time interval from the part of the video represented by the next pair of frame images.

FIG. 3A illustrates a set of images associated with a part of a video according to an example embodiment. The part of the video indicates a straight rightward motion such as the predetermined motion of FIG. 2A, with an open hand spread finger posture, such as the posture of FIG. 1C. The set of images comprises image 301, image 302, image 303, image 304, image 305, and image 306.

FIG. 3B illustrates a set of images associated with a part of a video according to an example embodiment. The part of the video indicates a downward leftward arcing motion such as the predetermined motion of FIG. 2D, with a posture relating to an open hand with spread fingers wherein the index finger and thumb are touching each other, such as the posture of FIG.

1D. The set of images comprises image 311, image 312, image 313, image 314, image 315, and image 316.

FIG. 3C illustrates a set of images associated with a part of a video according to an example embodiment. The part of the video indicates a crossing motion such as the predetermined motion of FIG. 2J, with closed hand posture, such as the posture of FIG. 1E. The set of images comprises image 321, image 322, image 323, image 324, image 325, and image 326.

FIGS. 4A-4D are diagrams illustrating scalar representations according to at least one example embodiment. The examples of FIGS. 4A-4D are merely examples of scalar representations, and do not limit the scope of the claims.

In an example embodiment, the set of scalar representations is a representation of movement based, at least in part, on the video. For example, the apparatus may evaluate information from the video to determine the representation of movement.

In an example embodiment, an apparatus generates a set of scalar representations of movement based, at least in part, on at least part of the video. The apparatus may determine the set of scalar representations based on a set of images associated with at least part of the video, such as the set of images of FIG. 3A. The apparatus may determine the set of scalar representations based on a different set of scalar representations of movement. For example, the apparatus may generate a first set of scalar representations based on a set of images from part of a video. In such an example, the apparatus may generate a second set of scalar representations based on the first set of scalar representations. A set of scalar representation may relate to a set of scalar representations of estimated optical flow, a divergence field, feature detection, and/or the like.

In an example embodiment, an apparatus generates a set of scalar representations of an estimated optical flow based on a set of images, such as the set of images of FIG. 3C. The set of scalar representations may be based, at least in part on representation of vector information associated with the estimated optical flow. For example, a pixel of the scalar representation may indicate divergence of a corresponding vector. The estimated optical flow may be based on a set of frame images, similar as described with reference to FIGS. 3A-3C. In an example embodiment, an apparatus may calculate an estimated optical flow based on the set of frame images. In such an example, the apparatus may calculate each scalar representation of the set of scalar representations based on each paired frame images from the set of paired frame images.

In an example embodiment, an apparatus calculates an estimated optical flow as a vector field as follows:

$$F(x,y)=[u(x,y),v(x,y)],$$

where F(x,y) represents the estimated optical flow vector field, u(x,y) represents the horizontal component of the estimated optical flow at position (x,y), and v(x,y) represents the vertical component of the estimated optical flow at position (x,y). Estimated optical flow may be calculated based on local contrast and texture for small motions. Estimated optical flow may estimate flow at each pixel. For example, estimated optical flow may be calculated using a Lucas-Kanade algorithm, a Horn-Schunck algorithm, a Watson-Ahumada algorithm, a Buxton-Buxton algorithm, a Black-Jepson algorithm, and/or the like. For example, the apparatus may calculate estimated optical flow based on image 302 of FIG. 3A and an adjacent frame image. In such an example, the horizontal component of the estimated optical flow may be similar to the scalar representation of FIG. 4A, and the vertical component of the estimated optical flow may be similar to the scalar representation of FIG. 4B.

In an example embodiment, an apparatus generates a set of scalar representations of a divergence field based on an estimated optical flow field. The set of scalar representations may be based, at least in part on representation of vector information associated with the divergence field. For example, a pixel of the scalar representation may indicate divergence of a corresponding vector. Given a vector F in an n-dimensional Euclidean field, divergence of F may be calculated as follows:

$$divF = \sum_{i=1}^{n} \frac{\partial F_i}{\partial x_i}$$

Divergence of an estimated optical flow may be calculated as follows:

$$divF = \frac{\partial u}{\partial x} + \frac{\partial v}{\partial y}$$

Figure 4A:
FIGS. 4A-4D are diagrams illustrating scalar representations according to at least one example embodiment.
Figure 4B:
Figure 4C:
Figure 4D:
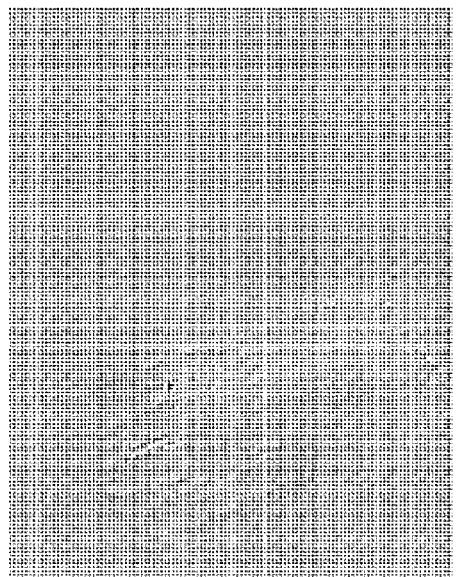

For example, an apparatus may calculate divergence of the estimated optical flow of FIG. 4A and FIG. 4B. In such an example, the divergence field may be represented by the scalar representation of FIG. 4C.

In an example embodiment, an apparatus may generate a set of scalar representations of feature detection of a divergence field of an estimated optical flow. The apparatus may perform feature detection to generate a local movement representation. The local movement representation may be a scalar representation or a vector representation. For example, the apparatus may generate a scalar feature representation similar to the example of FIG. 4D based on the divergence of FIG. 4C. The feature detection may be performed based on a feature detection, such as a maximally stable extremal regions feature detection, difference of Gaussian detection, a Harris-Laplacian detection, a Hessian-affine region detection, edges, image jets, and/or the like.

In an example embodiment, the set of scalar representations may be normalized. Normalized representations may be sets of representations that have a normalized structure. A normalized structure may be a structure that is common across sets of representations. For example a normalized structure may relate to a structure of a predetermined size, a structure comprising a predetermined number of representations and/or the like. In an example embodiment, a normalized structure comprises a predetermined number of local movement representations. The predetermined number may correspond to number of representations of a reference set of representations that are associated with a predetermined motion.

Without limiting the scope of the claims in any way, at least two possible technical effects of the determined representations may be improving efficiency of determining motion from a video. For example, the set of scalar representations of movement may be generated absent performance of a tracking calculation, generated absent performance of a segmentation calculation, and/or the like.

Figures 5A, 5B:
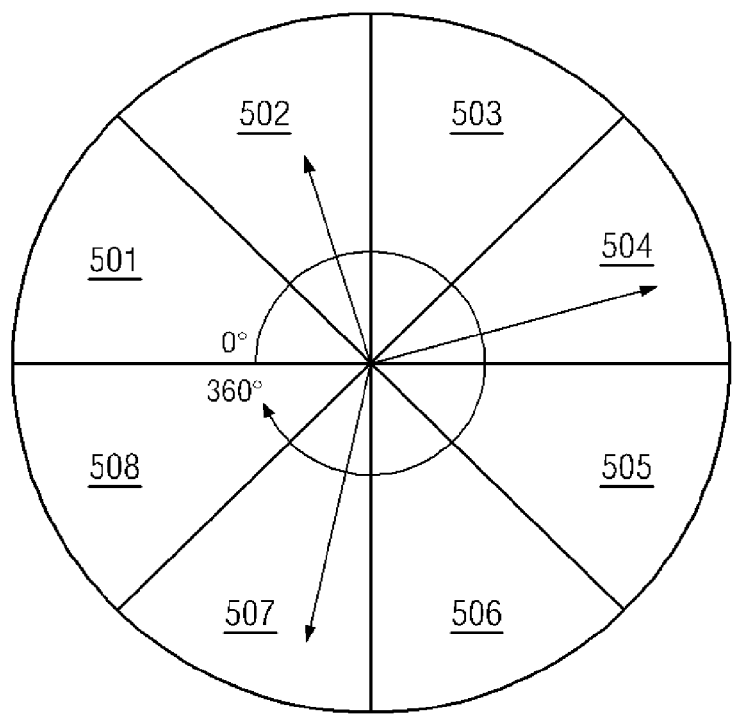
FIGS. 5A-5B are diagrams illustrating vector representations according to at least one example embodiment.

FIGS. 5A-5B are diagrams illustrating vector representations according to at least one example embodiment. The examples of FIGS. 5A-5B are merely examples of vector representations, and do not limit the scope of the claims.

In an example embodiment, an apparatus may generate a vector representation of movement based, at least in part, on the video. The vector representation may be based, at least in part, on a scalar representation of motion. The vector representation may be based, at least in part on feature detection of divergence of estimated optical flow. For example, a vector representation may comprise estimated optical flow vectors, orientation and amplitude of detected features, and/or the like. In an example embodiment, orientation of a vector may be quantized by associating a range of vector orientations with a distinct value. Quantization may comprise determining that a vector orientation is within the range of orientations associated with a distinct value, and representing the orientation of the vector by the distinct value. For example, FIG. 5A illustrates a vector representation relating to vector orientation quantization relating to eight distinct values, distinct values 501-508. However, number of distinct values may vary across embodiments. For example, an embodiment may quantize vectors in relation to eighty distinct values. In the example of FIG. 5A, the circle of possible vector orientations is equally subdivided into eight regions, with vectors coinciding with regions having designated distinct values of 2, 4, and 7. In an example embodiment, the orientation of these vectors is represented by the distinct values 2, 4, and 7, respectively.

In an example embodiment, a vector is represented by a purely directional vector descriptor. For example, a vector may be represented solely by its orientation. In an example embodiment, a purely directional vector descriptor may relate to a vector descriptor where all related vector descriptors have a normalized unitary magnitude. In such an example, the vector may be represented as a quantized purely directional vector. A quantized purely directional vector may be represented by the distinct value associated with the orientation for the represented vector. For example, representation of a vector having an orientation within a region corresponding to a distinct value of 79 may be represented by a purely directional vector representation indicating the distinct value of 79.

In an example embodiment, a set of vectors is represented by a purely directional vector descriptor. For example, the set of vectors may be represented by indication of regions that coincide with at least one vector. In such an embodiment, a set of vectors comprising a plurality of vectors that coincide with a region indicated by a distinct value of 33 would comprise indication of distinct value 33 to represent the two vectors. In an example embodiment, such a set of vectors may be represented by a histogram. FIG. 5B illustrates an example of a histogram associated with eight distinct values indicating vector orientation, distinct values 521-528. A histogram may comprise an ordered set of values, wherein location of a value within the set indicates a distinct value, and the information contained at the position indicates presence or absence of information associated with the distinct value. For example, the histogram of FIG. 5B, may indicate presence associated with distinct values 523 and 526 and absence associated with distinct values 521, 522, 524, 525, 527, and 528, where there are two vectors within a range designated by distinct value 523 and a single vector within a range designated by distinct value 526. In an example embodiment, a purely directional vector descriptor is a histogram.

In an example embodiment, local motion representations lack representation of movement amplitude between each other. In such an example, each local movement representation may lack representation of amplitude. For example, each local movement representation may be a purely directional vector descriptor.

In an example embodiment, the set of vector representations may be normalized. Normalized sets of representations may be sets of representations that have a normalized structure. A normalized structure may be a structure that is common across sets of representations. For example a normalized structure may relate to a structure of a predetermined size, a structure comprising a predetermined number of representations, and/or the like. In an example embodiment, a normalized structure comprises a predetermined number of vector representations. The predetermined number may correspond to number of representations of a reference set of representations that are associated with a predetermined motion. In an example embodiment, a normalized representation is seven concatenated purely directional vector histograms.

Without limiting the scope of the claims in any way, one possible technical advantage associated with a purely directional vector representation is avoiding calculation associated with speed of a motion. For example, a purely directional vector representation may provide substantially similar representations for a motion performed quickly and the same motion performed slowly.

In an example embodiment, an apparatus identifies at least one predetermined motion that correlates to representations of movement, such as a set of scalar representation, a set of vector representations, and/or the like. For example, identifying the predetermined motion may comprise evaluating and/or comparing the set of representations of movement to a reference set of representations of movement. Evaluation may comprise indexing reference sets of representations comprised in a table, such as a hash table, comprised in a tree, such as a vocabulary tree, comprised in a list, and/or the like.

In an example embodiment, an apparatus identifies a posture that correlates to at least one of the representations of the set of representations. For example, the apparatus may perform a single image indexing to identify a posture. In such an example, the apparatus may identify the posture separately from identification of a predetermined motion. In another example, the apparatus may identify the posture as part of the determination of the predetermined motion. For example, posture information may be convolved within the representation of the predetermined motion. In such an example, a representation may inherently comprise information that indicates a posture as well as a movement. For example, a representation of a closed hand performing a straight leftward motion may identifiably differ from a representation of an open hand performing a straight leftward motion.

In an example embodiment, an apparatus may optimize evaluation of the reference set of representations based, at least in part, on a normalized structure between each reference set of representation and representation of motion. For example, the evaluation may comprise a variation analysis, such as a distance calculation, between the set of representations of movement and the reference set of representations.

Figure 6:
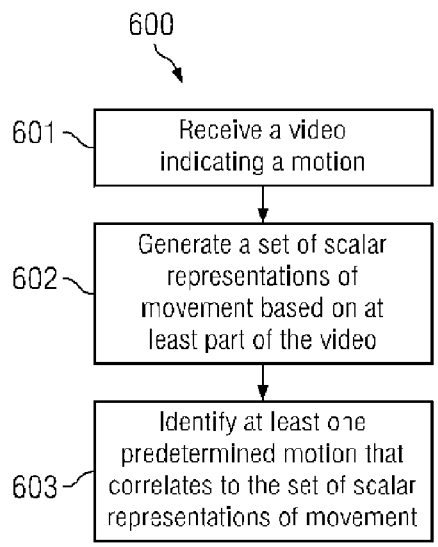
FIG. 6 is a flow diagram showing a set of operations for representing a message chain according to at least one example embodiment
Figure 10:
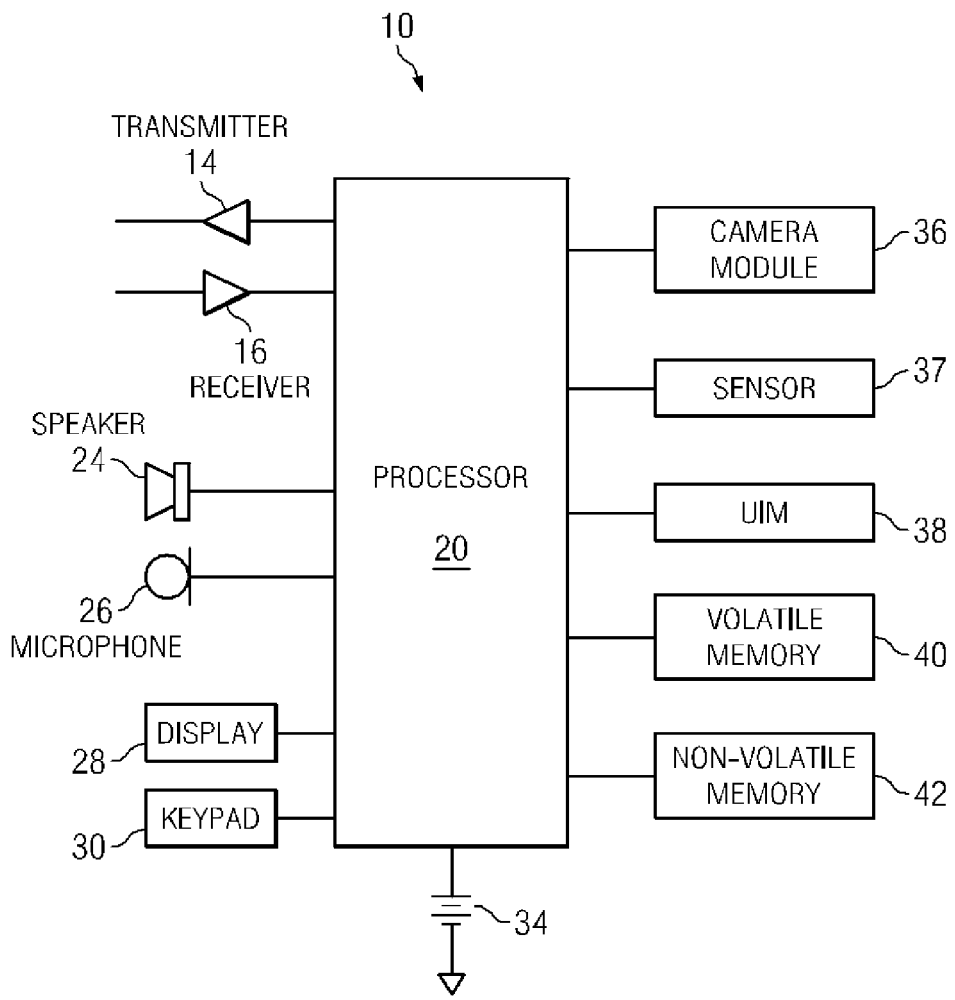
FIG. 10 is a block diagram showing an apparatus according to at least one example embodiment.

FIG. 6 is a flow diagram showing a set of operations 600 for representing a message chain according to at least one example embodiment. An apparatus, for example electronic device 10 of FIG. 10 or a portion thereof, may utilize the set of operations 600. The apparatus may comprise means, including, for example processor 20 of FIG. 10, for performing the operations of FIG. 6. In an example embodiment, an apparatus, for example device 10 of FIG. 10, is transformed by having memory, for example memory 42 of FIG. 10, comprising computer code configured to, working with a processor, for example processor 20 of FIG. 10, cause the apparatus to perform set of operations 600.

At block 601, the apparatus receives a video indicating a motion. The apparatus may receive the video by retrieving information from one or more memories, such as non-volatile memory 42 of FIG. 10, receiving the video from a part of the apparatus, such as a camera module, for example camera module 36 of FIG. 10, receiving the video from a receiver, such as receiver 16 of FIG. 10, receiving the video from a separate device, a separate video camera, and/or the like. The video may be similar as described with reference to FIGS. 3A-3C.

At block 602, the apparatus generates a set of scalar representations of movement based, at least in part, on at least part of the video. The set of scalar representations may be similar as described with reference to FIGS. 4A-4D.

At block 603, the apparatus identifies at least one predetermined motion that correlates to the set of scalar representations of movement. The predetermined motion may be similar as described with reference to FIGS. 2A-2J.

Figure 7:
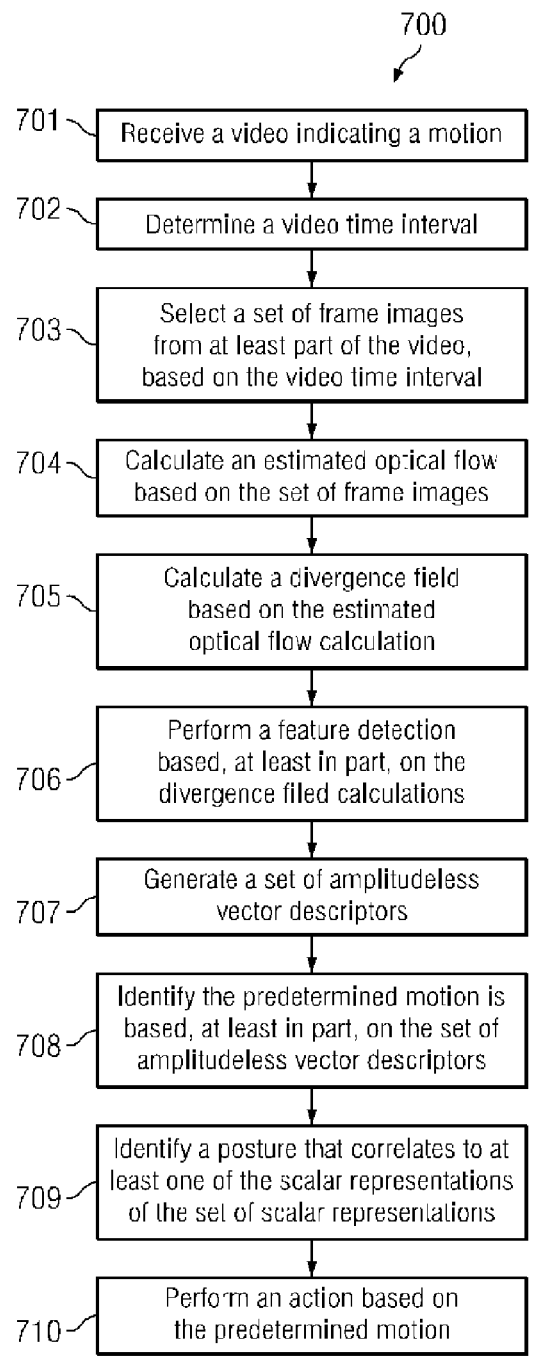
FIG. 7 is a flow diagram showing a set of operations for representing a message chain according to at least one example embodiment.

FIG. 7 is a flow diagram showing a set of operations 700 for representing a message chain according to at least one example embodiment. An apparatus, for example electronic device 10 of FIG. 10 or a portion thereof, may utilize the set of operations 700. The apparatus may comprise means, including, for example processor 20 of FIG. 10, for performing the operations of FIG. 7. In an example embodiment, an apparatus, for example device 10 of FIG. 10, is transformed by having memory, for example memory 42 of FIG. 10, comprising computer code configured to, working with a processor, for example processor 20 of FIG. 10, cause the apparatus to perform set of operations 700.

At block 701, the apparatus receives a video indicating a motion, similar as described with reference to block 601 of FIG. 6.

At block 702, the apparatus determines a video time interval similar as described with reference to FIGS. 3A-3C.

At block 703, the apparatus selects a set of frame images from at least part of the video based, at least in part on the video time interval similar as described with reference to FIGS. 3A-3C.

At block 704, the apparatus calculates an estimated optical flow based on the set of frame images, similar as described with reference to FIGS. 4A-4D.

At block 705, the apparatus calculates a divergence field based, at least in part, on the estimated optical flow calculation similar as described with reference to FIGS. 4A-4D.

At block 706, the apparatus performs a feature detection based, at least in part, on the divergence field calculations similar as described with reference to FIGS. 4A-4D.

At block 707, the apparatus generates a set of purely directional vector descriptors similar as described with reference to FIGS. 5A-5B.

At block 708, the apparatus identifies at least one predetermined motion that correlates to the set of purely directional vector descriptors.

At block 709, the apparatus identifies a posture that correlates to at least one of the scalar representations of the set of scalar representations.

At block 710, the apparatus performs an action based at least in part on the predetermined motion. The apparatus may perform the action in response to identifying the predetermined motion.

Figure 8:
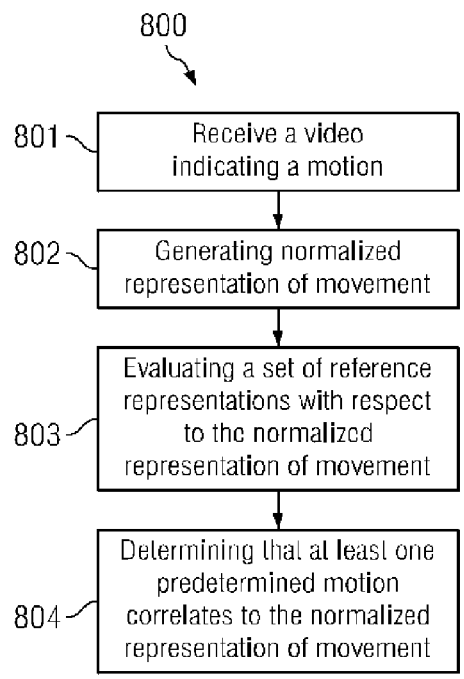
FIG. 8 is a flow diagram showing a set of operations for representing a message chain according to at least one example embodiment.

FIG. 8 is a flow diagram showing a set of operations 800 for representing a message chain according to at least one example embodiment. An apparatus, for example electronic device 10 of FIG. 10 or a portion thereof, may utilize the set of operations 800. The apparatus may comprise means, including, for example processor 20 of FIG. 10, for performing the operations of FIG. 8. In an example embodiment, an apparatus, for example device 10 of FIG. 10, is transformed by having memory, for example memory 42 of FIG. 10, comprising computer code configured to, working with a processor, for example processor 20 of FIG. 10, cause the apparatus to perform set of operations 800.

At block 801, the apparatus receives a video indicating a motion, similar as described with reference to block 601 of FIG. 6.

At block 802, the apparatus generates a normalized representation of movement similar as described with reference to FIGS. 4A-4D and FIGS. 5A-5B.

At block 803, the apparatus evaluates a set of reference representations with respect to the normalized representation of the movement.

At block 804, the apparatus determines that at least one predetermined motion correlates to the normalized representation of the movement.

Figure 9:
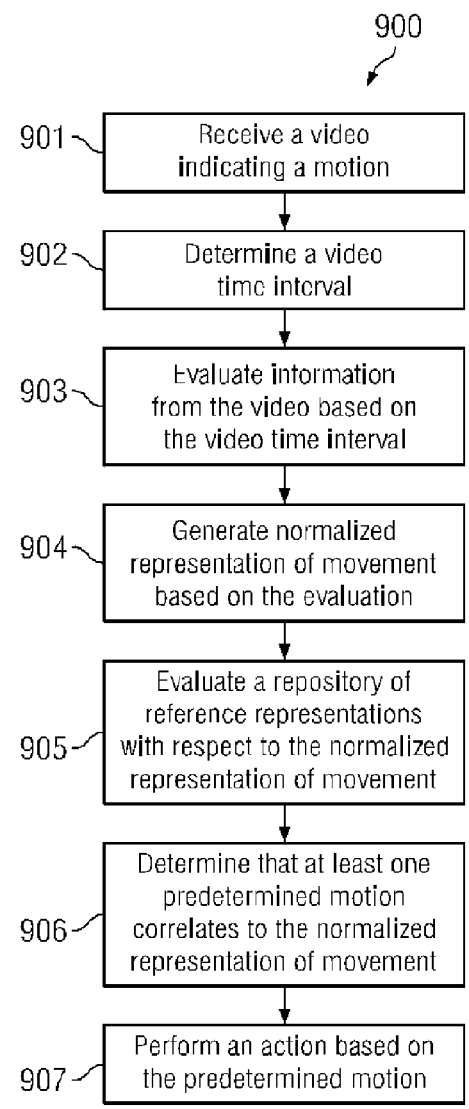
FIG. 9 is a flow diagram showing a set of operations for representing a message chain according to at least one example embodiment.

FIG. 9 is a flow diagram showing a set of operations 900 for representing a message chain according to at least one example embodiment. An apparatus, for example electronic device 10 of FIG. 10 or a portion thereof, may utilize the set of operations 900. The apparatus may comprise means, including, for example processor 20 of FIG. 10, for performing the operations of FIG. 9. In an example embodiment, an apparatus, for example device 10 of FIG. 10, is transformed by having memory, for example memory 42 of FIG. 10, comprising computer code configured to, working with a processor, for example processor 20 of FIG. 10, cause the apparatus to perform set of operations 900.

At block 901, the apparatus receives a video indicating a motion, similar as described with reference to block 601 of FIG. 6.

At block 902, the apparatus determines a video time interval similar as described with reference to FIGS. 3A-3C.

At block 903, the apparatus evaluates information from the video based, at least in part, on the video time interval, similar as described with reference to FIGS. 4A-4D.

At block 904, the apparatus generates a normalized representation of movement, similar as described with reference to FIGS. 4A-4D and FIGS. 5A-5B.

At block 905, the apparatus evaluates a set of reference representations with respect to the normalized representation of the movement.

At block 906, the apparatus determines that at least one predetermined motion correlates to the normalized representation of the movement.

At block 907, the apparatus performs an action based at least in part on the predetermined motion. The action may be in response to identifying the predetermined motion.

FIG. 10 is a block diagram showing an apparatus, such as an electronic device 10, according to at least one example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1A-10. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1A-10. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and/or may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1A-10. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. Display 28 may display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format. In an example embodiment, the camera module comprises a plurality of digital cameras. The apparatus may utilize the plurality of digital cameras for capturing a three dimensional image. For example, the apparatus may utilize stereo vision provided by two digital cameras to capture a three dimensional image. In an example embodiment, the media capturing element comprises a three dimensional scanner. The apparatus may utilize the three dimensional scanner to capture a three dimensional image.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1A-10. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like.

Although FIG. 10 illustrates an example of an electronic device that may utilize embodiments of the invention including those described and depicted, for example, in FIGS. 1A-10, electronic device 10 of FIG. 10 is merely an example of a device that may utilize embodiments of the invention.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 10. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. For example, block 708 of FIG. 7 may be performed after block 709 of FIG. 7. Furthermore, if desired, one or more of the above-described functions may be optional or may be combined. For example, blocks 702 and 703 of FIG. 7 may be optional and/or combined with block 704.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   a processor;
   memory including computer program code, the memory and the computer program code configured to, working with the processor, cause the apparatus to perform at least the following:
   receiving a video indicating a motion;
   determining a video time interval, wherein the video time interval relates to a time interval that substantially uniformly segments at least part of the video;
   generating a set of normalized representations of movement based, at least in part, on the video and the video time interval, the set of normalized representations of movement having a normalized structure that comprises a predetermined number of local movement representations that corresponds to a number of representations of a reference set of representations that are associated with at least one predetermined motion;
   evaluating a reference set of representations with respect to the set of normalized representations of the movement; and
   determining that the predetermined motion correlates to the set of normalized representations of the movement based, at least in part, on the evaluation.

2. The apparatus of claim 1, wherein generating the set of normalized representations of the movement comprises evaluating information from the video based, at least in part, on the video time interval.

3. The apparatus of claim 2, wherein the video time interval is based, at least in part, on number of representations of the reference set of representations that are associated with the predetermined motion.

4. The apparatus of claim 1, wherein each local movement representation has a predetermined size.

5. The apparatus of claim 1, wherein the evaluating of the reference set of representations is optimized based, at least in part, on the predetermined number of local movement representations and the predetermined size of the local movement representation.

6. The apparatus of claim 1, wherein the local movement representations lack representation of movement amplitude between each other.

7. The apparatus of claim 1, wherein each local movement representation lacks representation of amplitude.

8. The apparatus of claim 7, wherein each local movement representation is an amplitudeless vector.

9. The apparatus of claim 8, wherein the amplitudeless vector is a histogram.

10. The apparatus of claim 1, wherein the memory and the computer program code are further configured to, working with the processor, cause the apparatus to further perform at least performing an action based at least in part on the predetermined motion, in response to identifying the predetermined motion.

11. The apparatus of claim 10, wherein the action relates to invoking an input event.

12. A method, comprising:
   receiving a video indicating a motion;
   determining a video time interval, wherein the video time interval relates to a time interval that substantially uniformly segments at least part of the video;
   generating a set of normalized representations of movement based, at least in part, on the video and the video time interval, the set of normalized representations of movement having a normalized structure that comprises a predetermined number of local movement representations that corresponds to a number of representations of a reference set of representations that are associated with at least one predetermined motion;
   evaluating a reference set of representations with respect to the set of normalized representations of the movement; and
   determining that the predetermined motion correlates to the set of normalized representations of the movement based, at least in part, on the evaluation.

13. The method of claim 12, wherein generating the set of normalized representations of the movement comprises evaluating information from the video based, at least in part, on the video time interval.

14. The method of claim 13, wherein the video time interval is based, at least in part, on number of representations of the reference set of representations that are associated with the predetermined motion.

15. The method of claim 12, wherein the set of normalized representations of movement has a normalized structure that comprises a predetermined number of local movement representations.

16. A non-transitory computer-readable medium encoded with instructions that, when executed by a computer, perform:
   receiving a video indicating a motion;
   determining a video time interval, wherein the video time interval relates to a time interval that substantially uniformly segments at least part of the video;
   generating a set of normalized representations of movement based, at least in part, on the video and the video time interval, the set of normalized representations of movement having a normalized structure that comprises a predetermined number of local movement representations that corresponds to a number of representations of a reference set of representations that are associated with at least one predetermined motion;
   evaluating a reference set of representations with respect to the set of normalized representations of the movement; and
   determining that the predetermined motion correlates to the set of normalized representations of the movement based, at least in part, on the evaluation.

* * * * *